Patented Aug. 7, 1951

2,563,611

UNITED STATES PATENT OFFICE 2,563,611

COPOLYMERS OF STYRENE AND PHENYLALLYL ALCOHOL

Charles L. Mills, Jr., and John Mann Butler, Dayton, Ohio, assignors to Monsanto Chemical Company, St. Louis, Mo., a corporation of Delaware No Drawing. Application September 18, 1948, Serial No. 50,000

2 Claims. (Cl. 260—88.1)

This invention relates to the production of valuable resinous products by the conjoint polymerization of styrene and a substituted allyl alcohol. More particularly the invention relates to a copolymer of styrene having more desirable chemical and physical properties than polystyrene.

Polystyrene is a valuable and useful article of commerce but its use is substantially limited by its lack of an adequate thermostability for many applications. Furthermore, copolymers of styrene are well known but copolymers with allyl alcohol and substituted allyl alcohols are unknown, or generally regarded as impracticable.

One purpose of this invention is to provide copolymers of styrene having improved chemical and physical properties, and especially an improved thermostability. A further purpose of this invention is to provide a copolymer of styrene and a substituted allyl alcohol. A further purpose of this invention will be apparent from the following specification.

In copending application, Serial No. 46,365, now U. S. Patent 2,537,622, filed August 26, 1948, by John Mann Butler, there is described and claimed methods for the preparation of β-phenylallyl alcohol. This compound has chemical properties quite different from allyl alcohol, especially with respect to polymerizability. This application also claims the method for preparing the β-phenylallyl alcohol by the oxidation of α-methyl styrene with selenium dioxide in the presence of an anhydride of a carboxylic acid, for example acetic anhydride, and hydrolyzing the resulting ester, such as β-phenylallyl acetate to form β-phenylallyl alcohol.

It has now been found that β-phenylallyl alcohol is capable of copolymerization with styrene and that the copolymers exhibit unusual beneficial effects. It has been found that copolymers of 70 to 98 percent of styrene and from 2 to 30 percent of the β-phenylallyl alcohol are greatly superior in their physical properties to polystyrene. This is especially true with respect to the heat distortion point. Copolymers of 10 to 25 percent are unusually effective in that they are capable of withstanding boiling water without the usual distortion experienced by polystyrene and many copolymers of styrene. Accordingly, the new copolymer is of exceptional value as a molding composition for various articles which are to be subjected to elevated temperatures as in sterilization by boiling water.

The new copolymers may be prepared by either mass or emulsion polymerization methods, in the presence of suitable peroxide catalysts by methods quite conventional in the preparation of olefin polymers.

It is generally desirable to use mass polymerization methods, which are usually conducted by heating the mixed monomer in the presence of from 0.005 to 1.0 percent by weight of an oxygen producing substance, such as benzoyl peroxide, hydrogen peroxide, acetyl peroxide, or other peroxide which is soluble in the monomer. The rate of polymerization will depend upon the quantity and particular nature of the catalyst used. Temperatures between 50° C. and 200° C. are effective. Generally from two to two hundred hours may be used to complete the reaction and produce a clear, transparent, solid resin. Frequently it is desirable to initiate the polymerization at lower temperatures and gradually increase the temperature as the polymerization proceeds. The solid polymer obtained by the mass polymerization is generally ground to particles of the desired size, which may be molded by operations conventional in the art.

The new copolymers may also be prepared by polymerization in an aqueous medium. The monomer may be charged at the outset of the reaction or gradually introduced into the aqueous medium throughout the reaction. Usually an emulsifying agent is used, for example a rosin soap, a sodium alkyl sulfate, triethanolamine, salts of sulfonated hydrocarbons and water soluble salts of high molecular weight fatty acids, and mixtures thereof obtained by the saponification of animal and vegetable oils, and other compounds containing both hydrophobic and hydrophilic radicals. The emulsion polymerization are catalyzed by means of water soluble peroxides, such as sodium peroxide, hydrogen peroxide, potassium persulfate, and potassium perborate, which may be charged at the outset of the reaction or in increments throughout the duration of the polymerization. Upon completion of the polymerization the solid polymer is separated from the aqueous phase by precipitation and filtration, the precipitate usually being induced by the destruction of the emulsifying agent. In some instances the emulsion may be directly dried without precipitation of the solid polymer. The copolymer in the finely divided form, as obtained from the emulsion polymerization may be used directly as a molding powder.

Further details of the preparation are set forth with respect to the following examples.

Example 1

A glass reaction vessel was charged with 900 parts by weight of styrene, 100 parts by weight of β-phenylallyl alcohol and one part of benzoyl peroxide. The mixture was heated for four days at 60° C., six days at 90° C., five days at 135° C., and one day at 175° C. Transparent, hard, resinous materials were thereby obtained which were soluble in benzene, carbon tetrachloride, dioxane, dimethylformamide and cyclohexane. Solvent purified copolymers were found to have an oil bath heat distortion point of 102° C. as compared to 95° C. for polystyrene.

*Example 2*

Using the procedure described in the preceding example, 800 parts by weight of styrene and 200 parts by weight of β-phenylallyl alcohol were copolymerized in the presence of 0.1 percent of benzoyl peroxide. The A. S. T. M. oil bath heat distortion point was found to be 114° C.

The invention is defined by the following claims. We claim:

1. A copolymer of from 2 to 30 percent of β-phenylallyl alcohol and 70 to 98 percent of styrene.
2. A copolymer of 10 to 25 percent of β-phenylallyl alcohol and 75 to 90 percent of styrene.

CHARLES L. MILLS, JR.
JOHN MANN BUTLER.

REFERENCES CITED

The following references are of record in the file of this patent:

UNITED STATES PATENTS

| Number | Name | Date |
|---|---|---|
| 2,332,900 | D'Alelio | Oct. 26, 1943 |
| 2,419,221 | Kenyon et al. | Apr. 22, 1947 |

FOREIGN PATENTS

| Number | Country | Date |
|---|---|---|
| 566,344 | Great Britain | Dec. 27, 1944 |